United States Patent
Hojak

(10) Patent No.: US 9,180,895 B2
(45) Date of Patent: Nov. 10, 2015

(54) BEARING ARRANGEMENT FOR A TORSION BAR SPRING OF THE ROLL STABILIZATION SYSTEM OF A RAIL VEHICLE

(75) Inventor: Gerhard Hojak, Graz (AT)

(73) Assignee: Siemens AG Oesterreich, Vienna (AT)

( * ) Notice: Subject to any disclaimer, the term of this patent is extended or adjusted under 35 U.S.C. 154(b) by 1762 days.

(21) Appl. No.: 12/087,798

(22) PCT Filed: Dec. 7, 2006

(86) PCT No.: PCT/EP2006/069399
§ 371 (c)(1),
(2), (4) Date: Jul. 15, 2008

(87) PCT Pub. No.: WO2007/087924
PCT Pub. Date: Aug. 9, 2007

(65) Prior Publication Data
US 2010/0239197 A1     Sep. 23, 2010

(30) Foreign Application Priority Data
Jan. 16, 2006   (AT) .................................. A 63/2006

(51) Int. Cl.
| *F16C 33/74* | (2006.01) |
| *B61F 5/24* | (2006.01) |
| *F16C 17/02* | (2006.01) |
| *F16C 33/08* | (2006.01) |
| *F16F 1/16* | (2006.01) |
| *F16F 1/38* | (2006.01) |
| *F16J 15/32* | (2006.01) |
| *F16J 15/34* | (2006.01) |

(52) U.S. Cl.
CPC . *B61F 5/24* (2013.01); *F16C 17/02* (2013.01); *F16C 33/08* (2013.01); *F16C 33/74* (2013.01); *F16F 1/16* (2013.01); *F16F 1/38* (2013.01); *F16J 15/3256* (2013.01); *F16J 15/3456* (2013.01); *B60G 2204/1222* (2013.01); *F16F 2230/30* (2013.01)

(58) Field of Classification Search
USPC ......... 384/144, 147, 158, 159, 183, 185, 295, 384/296; 277/349, 353, 361, 412, 564
See application file for complete search history.

(56) References Cited

U.S. PATENT DOCUMENTS

| 3,939,779 | A | | 2/1976 | Pringle |
| 4,172,591 | A | | 10/1979 | Craig |
| 4,653,344 | A | * | 3/1987 | Nelson .......................... 384/295 |
| 5,788,264 | A | * | 8/1998 | Adkins et al. .......... 280/124.106 |
| 6,155,574 | A | * | 12/2000 | Borgstrom et al. ........... 277/419 |

FOREIGN PATENT DOCUMENTS

| EP | 1067307 A2 | | 1/2001 |
| GB | 2219475 | * | 12/1989 |
| RU | 2168431 C2 | | 6/2001 |

* cited by examiner

*Primary Examiner* — James Pilkington
(74) *Attorney, Agent, or Firm* — Laurence A. Greenberg; Werner H. Stemer; Ralph E. Locher

(57) ABSTRACT

A bearing for bearing a torsion bar spring of a roll stabilization system of a track vehicle comprises a split bearing bush for the torsion bar spring and a split bearing shell which comprises said bearing bush and which can be connected to the body/bogie. A pair of seals is mounted at one end of the bearing and consists of an inner, flexible inner seal sitting on the torsion bar spring and an outer, flexible outer seal sitting in the bearing shell. Every seal of the pair of seals comprises at least one peripheral sealing lip and the seals interact with each other via the sealing lips in a sealing manner.

8 Claims, 2 Drawing Sheets

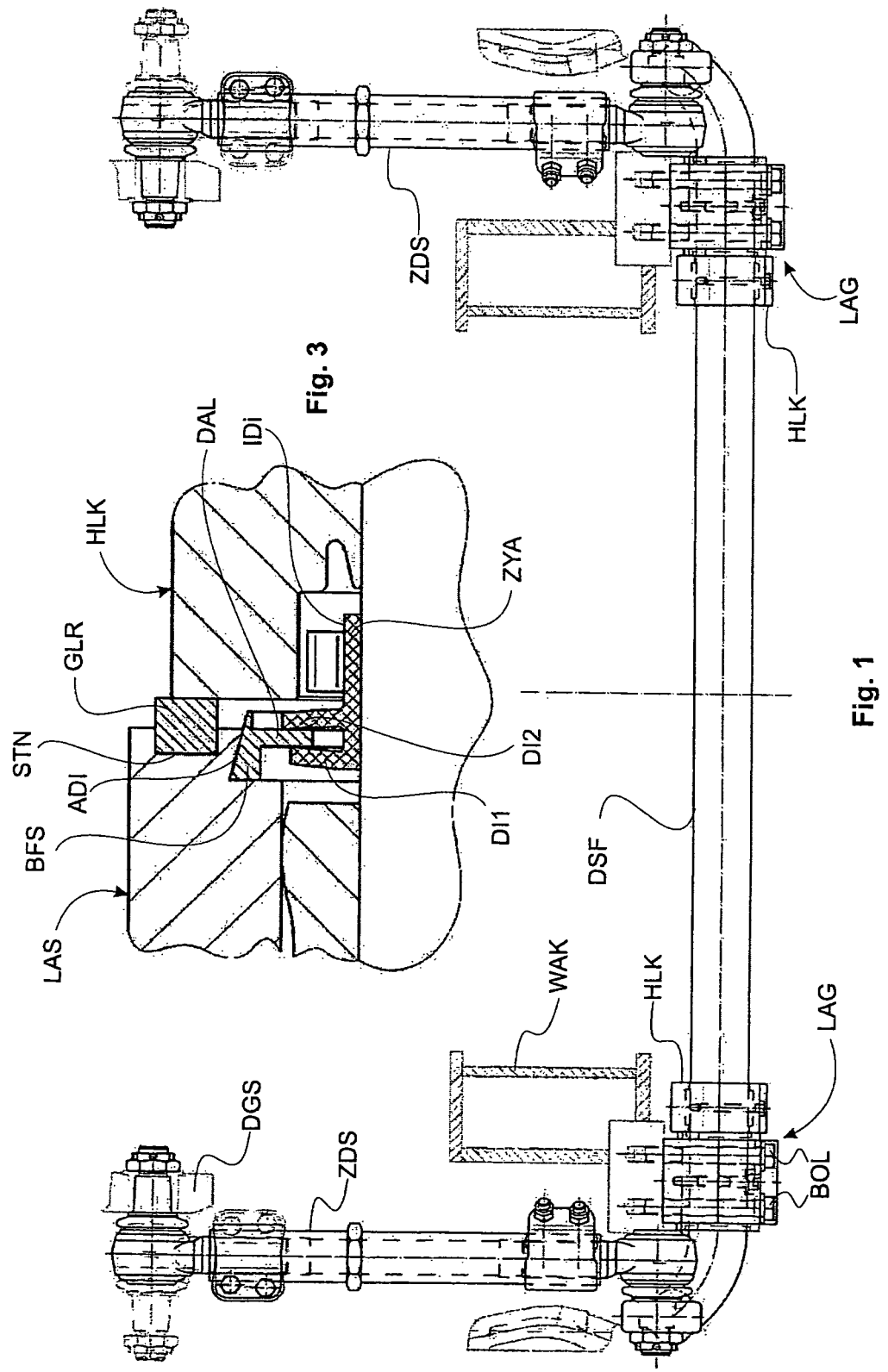

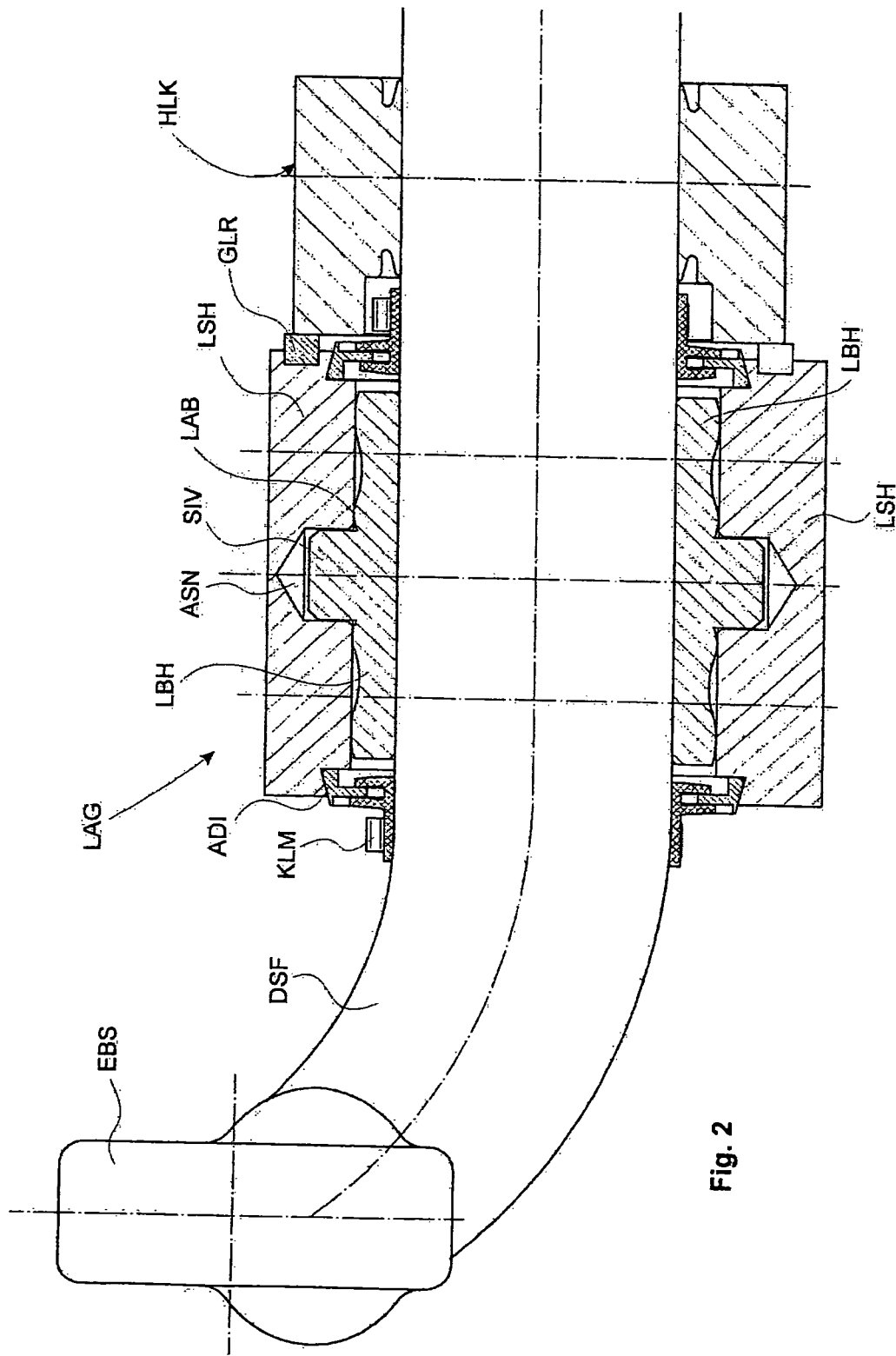

BEARING ARRANGEMENT FOR A TORSION BAR SPRING OF THE ROLL STABILIZATION SYSTEM OF A RAIL VEHICLE

CROSS REFERENCE TO RELATED APPLICATIONS

This application is the US National Stage of International Application No. PCT/EP2006/069399, filed Dec. 7, 2006 and claims the benefit thereof. The International Application claims the benefits of Austrian application No. A63/2006 AT filed Jan. 16, 2006, both of the applications are incorporated by reference herein in their entirety.

FIELD OF INVENTION

The invention relates to a bearing for mounting a torsion bar spring of the roll stabilization system of a rail vehicle, with a split bearing bush for the torsion bar spring and with, enclosing the bearing bush, a split bearing shell which can be connected to the car body.

BACKGROUND OF INVENTION

In modern rail vehicles, the increasing use of air suspension systems, which considerably improve ride quality, requires from a technical viewpoint the use of (anti-)roll stabilization systems in order to minimize roll oscillations, an (anti-)roll stabilization system basically consisting of a torsion bar spring, push/pull bars and two torsion bar bearing arrangements. The torsion bar spring generally runs transversely to the direction of travel, and is mounted on the car body. From both of its ends, the push/pull bars extend to the wheel truck. The roll stabilization system can also be disposed the other way round. In this case the torsion bar spring is mounted on the wheel truck. From both of its ends, the push/pull bars run to the car body. Each wheel truck can be provided with one or two torsion bar springs.

Particularly exacting requirements are placed on the bearing arrangement of the torsion bar spring, particularly in terms of freedom from play and low wear over a long period of use with Cardan deformability and high, well-defined stiffness. On the other hand, contamination of the sliding surfaces and sticking during the long period of service must be avoided with a high degree of reliability.

These requirements are particularly accentuated if one-piece torsion bar springs are used which are curved at the end. The bearing bushes and bearing shells of such torsion bar springs cannot be one-piece, as it would otherwise be impossible to slip them over the curved ends of the torsion bar spring or more precisely over the forged end pieces of the rods used for linkage to the push/pull bars. Rather the bearing bushes are of two-part or split design. The two-part design of the bearing shells (steel parts) exacerbates the problems of sealing the inside of the bearing to the outside and also of the required freedom from play, which means that the requirements in respect of minimal fouling, low wear and play as well as well-defined stiffness over a long period of use have yet to be satisfied.

For the reasons mentioned, when using anti-roll bar bearing arrangements on curved torsion bar springs according to the prior art, short bearing replacement intervals and/or an enhanced design with regreasing capability are required. For this purpose the bearing must be dismantled and the bearing bushes replaced, or grease must be applied to the bearing surface through a bore, e.g. via a grease nipple. With regard to distributing the grease over the entire sliding surface, it is additionally necessary to provide the bearing bush with grooves, which makes it more expensive to produce. Determining lubrication intervals increases maintenance work, noncompliance with the maintenance/lubrication intervals possibly detrimentally affecting the tribological pairing between torsion bar spring and bearing such that appreciable material abrasion may occur on the torsion bar spring—quite apart from an unacceptable level of bearing noise.

The use of split bearings can only be dispensed with if the torsion bar springs are implemented in a particular way whereby the levers in which the push/pull bars engage are connected to the torsion bar spring using a compression or keyed joint. The bearing arrangement is then located further out at the ends of the torsion bar spring. This design is not only expensive but also results in a very wide roll stabilization system.

SUMMARY OF INVENTION

An object of the invention is to create a bearing which largely overcomes the abovementioned problems.

This object is achieved with a bearing of the type mentioned in the introduction, wherein there is inventively provided, on at least one end face of the bearing, a pair of seals consisting of an inner, flexible internal seal seated on the torsion bar spring and an outer, flexible external seal seated in the bearing shell, each seal of the pair having at least one circumferential sealing lip, and the seals interacting via the sealing lips in a sealing manner.

In particular, the invention ensures play-free operation of the roll stabilization system over its entire, considerably increased period of service and lifetime, prevention of noise, no regreasing intervals between main inspections of the wheel trucks and therefore increased rail vehicle availability overall.

In an advantageous embodiment it is provided that a seal has two sealing lips, one sealing lip of the other seal engaging between said two sealing lips. This labyrinthine design produces improved sealing properties.

In addition, it may be advantageous if the internal seal has a cylindrical section designed to bear against the torsion bar spring and from which the at least one sealing lip projects radially, thereby producing a particularly effective seal against the surface of the torsion bar spring.

The sealing with respect to the bearing shell is further improved if the external seal (ADI) has a circumferential fastening web (BFS) projecting from the at least one projecting sealing lip (DAL) and accommodated in a front slot (STN) of the bearing shell (LAS).

In terms of good seating of the external seal in the bearing shell it may be advisable for the front slot to be tapered off toward the end face of the bearing shell.

In order to achieve a good seating of the bearing bush in the bearing shell in a simple manner, in a useful variant it is provided that each bearing bush section has an outwardly projecting retaining lug to which a suitably implemented recess in a bearing shell section is assigned.

Another advantageous variant is characterized by a split retaining clip at both end regions of the torsion bar spring to protect the torsion bar spring against axial shifting, wherein a plastic slip ring is disposed between an end face of the retaining clip and the adjacent end face of the bearing shell.

BRIEF DESCRIPTION OF THE DRAWINGS

The invention and further advantages thereof will now be explained in greater detail with reference to an exemplary embodiment illustrated in the accompanying drawings in which:

FIG. 1 shows a bottom view of a torsion bar spring of an (anti-)roll stabilization system on a rail vehicle with push/pull bars connected on both sides, FIG. 2 shows an enlarged view of a section in the area of one of the two bearings of the torsion bar spring and FIG. 3 shows, enlarged still further, a detail in the sealing area of the bearing

DETAILED DESCRIPTION OF INVENTION

FIG. 1 shows a general view of a torsion bar spring DSF of the roll stabilization system of a rail vehicle, wherein the torsion bar spring DSF is disposed transversely to the direction of travel on a wheel truck DGS to which it is mounted using two bearings LAG.

The torsion bar spring DSF is straight over most of the car width, but is curved at both ends to form anti-roll bar eyelets, i.e. widened end mounting pieces EBS (FIG. 2), which are used to enable connection to one end of a left- or right-hand push/pull rod ZDS, the other end of which can be connected to a car body WAK. In FIG. 1 the car body WAK and wheel truck DGS are merely indicated and the connecting and adjusting elements of the push/pull rods will not be described or designated in greater detail, as they are not essential for understanding the invention and are also well-known to the average person skilled in the art.

Referring to FIGS. 2 and 3 it can be seen that a bearing LAG according to the invention possesses a bearing bush LAB in which a straight section of the torsion bar spring DSF is mounted in a sliding manner. Said bearing bush can be implemented in two parts or with a longitudinal section. Mounted radially to the bearing bush LAB are retaining lugs SIV which project outward on both sides and which are implemented in a cylindrical manner here. The bearing bush is advantageously made of a plastic having good anti-friction and compressive properties. The outer surfaces of the bearing bush LAB are shaped such that they can well compensate tolerances of the steel components and radial movements of the torsion bar spring. In a recommended embodiment, the bearing bush LAB is provided with a low-friction plastic tube (not shown in the drawing) which can improve the sliding properties in the bearing LAG.

The bearing bush LAB or rather its halves LBH, is enclosed by the bearing shells LAS which are likewise two-part, each bearing shell half LSH possessing a recess ASN matched to the retaining lug of the bearing bush halves LSH so that the bearing bush LAB is untwistably and undisplaceably held inside the bearing shell LAS. The bearing shell halves advantageously made of metal are suitably clamped together and connected to the car body or wheel truck e.g. using bolts BOL indicated in FIG. 1.

On both end faces of the bearing there is provided a pair of seals consisting of an internal seal IDI and an external seal ADI.

As shown in the detail from FIG. 3, the internal seal IDI possesses a cylindrical section ZYA, the inner surface of which bears on the outer surface of the torsion bar spring DSF and is clamped to the torsion bar surface e.g. using a clamp KLM. From the cylindrical section ZYA project two sealing lips DI1 and DI2 which run radially and parallel to one another so that they form an intervening gap.

The external seal ADI has a radially inwardly projecting sealing lip DAL from which a circumferential fastening web BFS projects which is accommodated in a front slot STN of the bearing shell LAS. Said front slot STN is tapered off toward the end face of the bearing shell LAS so as to provide a good seating in the bearing shell LAS.

The radially inward projecting sealing lip DAL of the external seal ADI engages in the abovementioned gap between the two sealing lips DI1, DI2 of the internal seal IDI, thereby producing a labyrinthine seal. It should be stressed at this point that—unlike the bearing bush LAB and bearing shell LAS—the external and internal seal ADI, IDI are implemented circumferentially in one piece, which is essential for good sealing. In addition, it is of course possible for the external seal to possess two sealing lips and for a sealing lip of the internal seal to engage in the gap formed by same. Likewise, more than just one or two sealing lips can also be used.

The internal seal and external seal consist of an elastic but abrasion-resistant plastic or rubber.

At both ends of the torsion bar spring DSF (FIG. 1) there is provided a split retaining clip HLK for securing the torsion bar spring against axial shifting. This retaining clip is shown in detail in FIG. 2 or 3. As the left- and right-hand bearings LAG are to be mutually supported at the associated retaining clip, a plastic slip ring GLR is disposed between an end face of the retaining clip and the adjacent end face of the bearing shell LAS. Said slip ring GLR is advantageously inserted in a circumferential front slot STN implemented in the end face of the bearing shell LAS or rather its halves LS.

Prior to assembly of the bearing, the relevant sliding surfaces are greased with a lubricant which additionally improves the anti-friction and sealing properties of the bearing.

By virtue of its design, the inventive bearing produces much less noise, material erosion on the torsion bar spring is virtually negligible and bearing play can be minimized. On the other hand, the angularity produced by bending of the torsion bar spring can be compensated and a uniform surface appearance at the bearing point can be achieved. By using unsplit seals, the penetration of dirt and moisture can be prevented for a long time and, accordingly, service life considerably extended. As they are deformable, the one-piece seal sections can be pulled over the forged-on anti-roll bar eyelet of the bent torsion bar spring. Seal components do not therefore need to be bonded on-site any more, which has resulted in edge formation and additional abrasion. Mounting can also be performed more quickly, as the drying time for the bonding points is eliminated.

The bearing according to the invention can of course also be used for torsion bar springs with an external bearing arrangement, so that the anti-roll bar bearing arrangement is modular and the use of carry-over parts is possible.

The invention claimed is:

1. A torsion bar spring of a roll stabilization system of a rail vehicle, comprising:
   a bearing for mounting the torsion bar spring, wherein the torsion bar spring is arranged transversely to a direction of travel of the rail vehicle, and is mounted on a car body of the rail vehicle, wherein the bearing comprises:
   a split bearing bush for slidably mounting the torsion bar spring, wherein the split bearing bush comprises two bearing bush sections;
   a split bearing shell enclosing said bearing bush; and
   a pair of seals on at least one end face of the bearing,
   wherein the pair of seals comprises an inner flexible seal seated on the torsion bar spring and an outer flexible seal seated in the bearing shell,
   wherein each seal comprises at least one circumferential sealing lip, wherein the seals interact in a sealing manner via the sealing lips, and
   wherein the inner flexible seal and the outer flexible seal are each implemented circumferentially in one piece.

2. The torsion bar spring as claimed in claim 1, wherein the split bearing shell is connected to the car body.

3. The torsion bar spring as claimed in claim 2, wherein the inner flexible seal has a cylindrical section designed to bear against the torsion bar spring, and wherein from the cylindrical section at least one sealing lip projects radially.

4. The torsion bar spring as claimed in claim 3, wherein the outer flexible seal has a circumferential fastening web projecting from the at least one sealing lip which projects radially, and accommodated in a front slot of the bearing shell.

5. The torsion bar spring as claimed in claim 4, wherein the front slot is tapered off toward an end face of the bearing shell.

6. The torsion bar spring as claimed in claim 1, wherein the inner flexible seal comprises two sealing lips, and wherein the outer flexible seal comprises one sealing lip which engages between the two sealing lips of the inner flexible seal.

7. The torsion bar spring as claimed in claim 1, wherein each bearing bush section has an outwardly projecting retaining lug to which is assigned a suitably implemented recess in a bearing shell section.

8. The torsion bar spring as claimed in claim 1, further comprising a split retaining clip at both ends of the torsion bar spring to secure the torsion bar spring against axial shifting, and a plastic slip ring disposed between an end face of the retaining clip and the adjacent end face of the bearing shell.

* * * * *